Oct. 28, 1958  P. K. GIRTON  2,858,117
AGITATOR FOR A PASTEURIZER OR PROCESSOR
Filed May 15, 1956  2 Sheets-Sheet 2

Paul K. Girton
  INVENTOR.

BY *Clarence A. O'Brien*
and *Harvey B. Jacobson*
  Attorneys

United States Patent Office 2,858,117
Patented Oct. 28, 1958

2,858,117

AGITATOR FOR A PASTEURIZER OR PROCESSOR

Paul K. Girton, Millville, Pa.

Application May 15, 1956, Serial No. 584,929

7 Claims. (Cl. 259—44)

This invention relates to agitators and particularly to processors, pasteurizers, and mixing vats wherein the agitator functions to admix the ingredients therein.

Viscous liquids and dried products have a tendency to settle and lie inert at the lower part of the sloped bottom of a processor, pasteurizer, mixing vat or other device that has a vessel in which fluent materials are supported, and particularly as would be found in equipment of the dairy industry. An object of the present invention is to overcome this difficulty by providing a special type of agitator which sweeps these liquids and dried products into the upper levels of the vat with each revolution of the agitator so that the entire contents of the vessel, whatever the product, are readily and thoroughly mixed.

A more specific object of the invention is to provide a simple and effective agitator for a mixing device, the agitator having a hub provided with one or more, but preferably a pair of blades that protrude therefrom, the hub being drivingly connected to a motor operated shaft in such a manner that it is capable of pivoting so that the agitator blades tilt to conform to the inclination of the bottom of the vessel during each revolution of the agitator. On each revolution the full length of the agitator sweeps within a fraction of an inch of the bottom inasmuch as the agitator rides on nylon runners which retain it very close to actual contact with the sloped bottom of the vessel.

Another object of the invention is to provide in a processor or homogenizer or other type of mixing device, an improved agitator of such construction that it tilts to follow the slope of the bottom of the vessel, regardless of the shape of the bottom, the blades of the agitator following the slope of the bottom, being always held a small fraction of an inch spaced from the upper surface of the bottom by means of nylon runners carried by the blades of the agitator and in contact with the upper surface of the bottom.

A further object of the invention is to provide an agitator as described above together with means to center the agitator with respect to the rotary shaft that drives it, the centering means being such as to prevent the agitator from slipping down the slope of the bottom of the vessel yet allow the agitator to tilt freely in order to follow the slope of the bottom, the latter functioning as a stationary cam as the blade moves thereover.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a perspective view of a typical agitator made in accordance with the principles of the invention.

Figure 1:
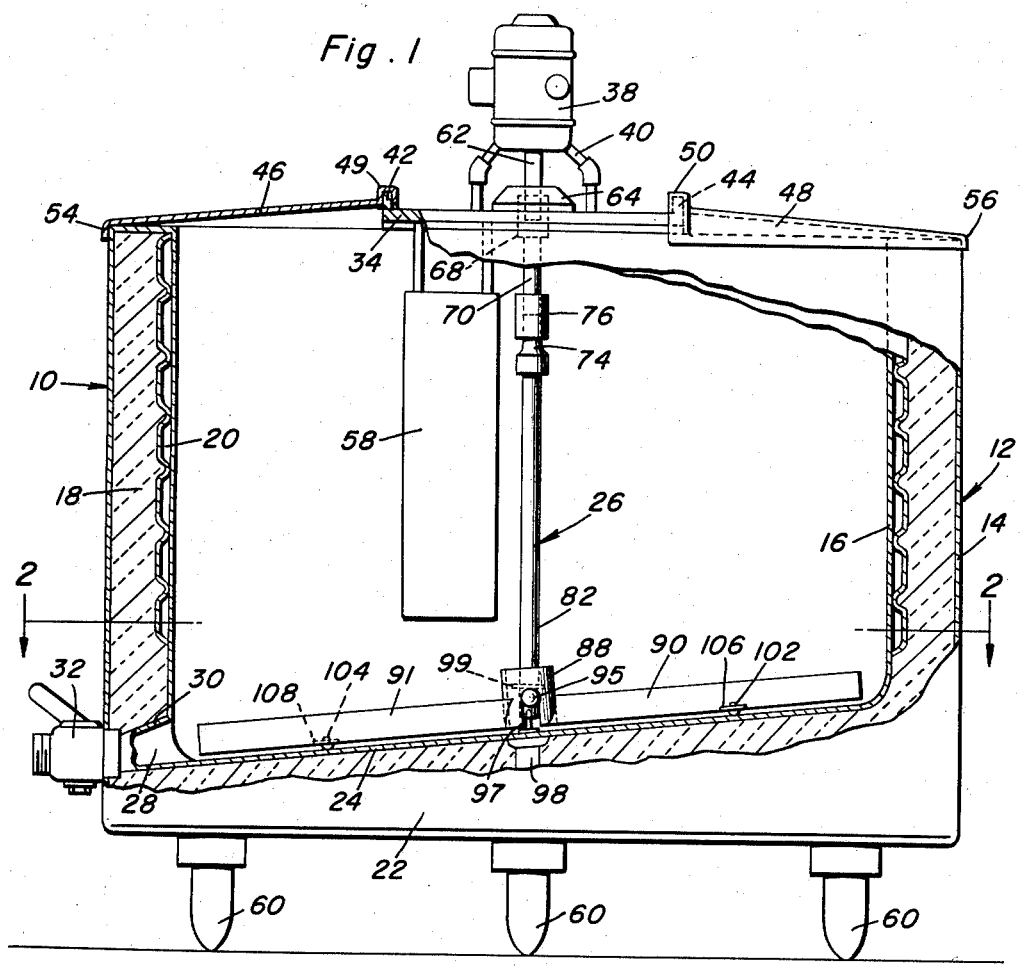
Figure 1 is an elevational view of one form of the invention, parts being broken away to illustrate internal detail.
Figure 2:
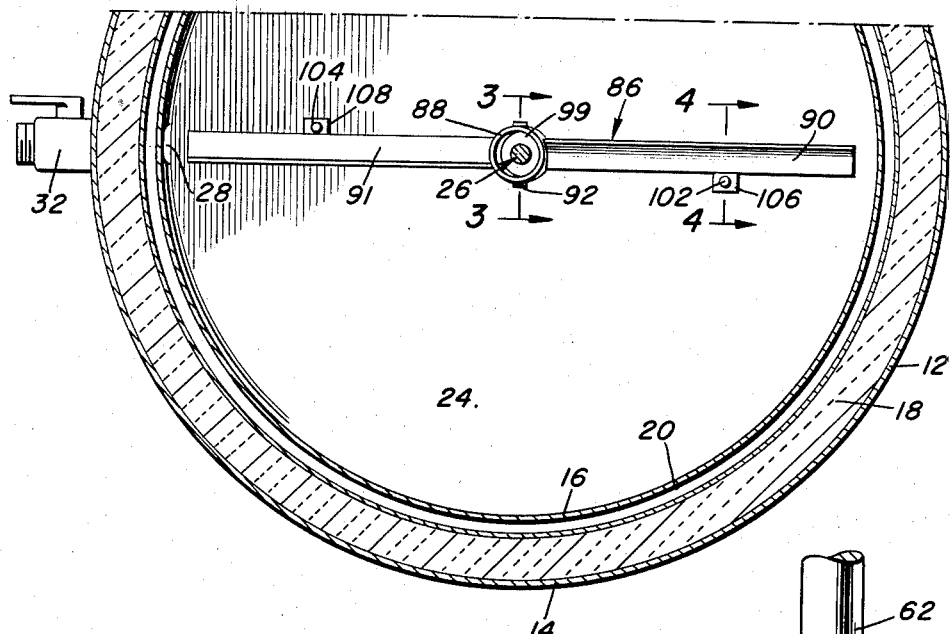
Figure 2 is a fragmentary sectional view taken approximately on the line 2—2 of Figure 1.
Figure 3:
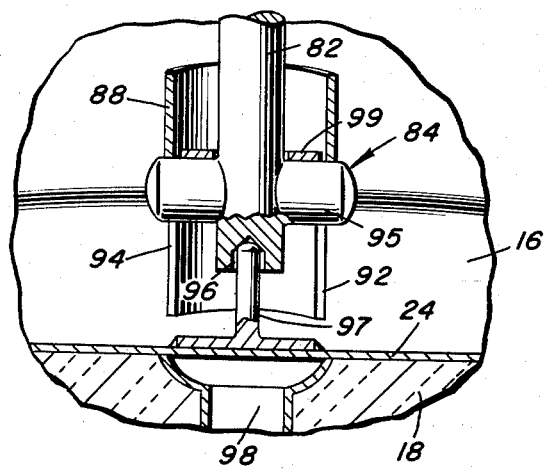
Figure 3 is an enlarged sectional view taken on the line 3—3 of Figure 2 and showing particularly the hub of the agitator together with a part of the shafts to which it is drivingly connected.
Figure 5:
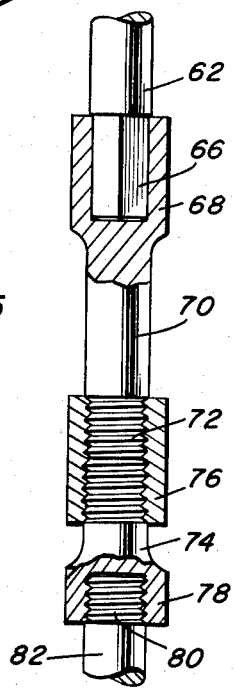
Figure 5 is an enlarged sectional view illustrating particularly the make up of the main drive shaft for the agitator.
Figure 4:
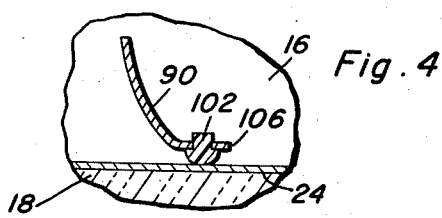
Figure 4 is an enlarged fragmentary sectional view taken on the line 4—4 of Figure 2 and showing one of the runners for a blade of the agitator.

In Figure 1 there is a typical mixing device 10 such as a processor, pasteurizer or mixing vat or other device that has a mixing function. Mixing device 10 consists of a vessel 12 having inner and outer housings 14 and 16 that are spaced apart to provide an insulating pocket therebetween. This insulating pocket is filled with insulation 18, the insulating value being increased by having air jackets 20 between insulation 18 and the inner casings 16. Legs 60 on vessel 12 support it. The bottom 22 of the mixing device 10 is sloped by having the lower wall 24 of the inner casing arranged at an angle with respect to the longitudinal axis of shaft 26. The bottom wall of the device is sloped toward an outlet 28 that is formed by small neck 30 which passes through an opening in the outer casing 14. This neck has a valve 32 connected to it so that the contents of the device may be emptied with a minimum of difficulty. The slope of the bottom of the device 10 is of importance inasmuch as without it, the contents of the device would not flow freely therefrom. Although outlet 28 is shown in the side of vessel 12, it is understood that it may with equal facility be in the bottom 22 without altering the principles of the invention. Moreover, the bottom 22 of vessel 12 is shown as flat but may be made of other configurations. For example, it may be dome shaped which would, of course, still be sloped or inclined toward an outlet for drainage.

An upper motor mounting plate 34 bridges the top of the vessel 12 and has a motor 38 supported on it by means of a motor stand 40. Longitudinal ribs 42 and 44 are at the opposite longitudinal edges of the plate 34, and they have covers 46 and 48 connected with them. These covers provide access to the interior of the vessel inasmuch as they are easily removable. Downwardly opening channels 49 and 50 along the inner edge of each cover fit on the ribs 42 and 44, while downturned lips 54 and 56 along the periphery of the covers fit over the edge of the vessel. Standard controls for the motor are used. In addition a baffle 58 is hung from the motor mounting plate 34 and is suspended in the vessel to prevent rotation of the contents thereof when the agitator is in operation.

Shaft 26 is driven by motor 38 and is made in sections. The shaft includes the first section 62 which is actually the armature shaft of the motor. This is passed through a collar 64 on motor mounting plate 34 and has a non-circular end 66. This non-circular end, as square or hexagonal, is fitted in a socket 68 of shaft 70. The opposite end of the shaft section is threaded as at 72 and is coupled to a shaft section 74 by means of a collar 76 that is threaded to each. Internally threaded socket 78 is on the section 74 and is in engagement with the threaded end 80 of the lower shaft section 82. Lower shaft section 82 has means 84 drivingly connecting it with an agitator 86 (Figure 6).

Agitator 86 consists of a preferably, but not necessarily, cylindrical hub 88 from which blades 90 and 91 protrude in a radial fashion. A pair of downwardly opening aligned slots 92 and 94 are formed in the hub 88 and they are parallel to each other. In addition they are diametrically opposite in the wall of the cylindrical hub 88. They are used to establish a drive connection between the agitator and the shaft 26. This is accomplished by utilizing the means 84 that consist of a transverse pin 95 fixed or otherwise rigidly connected with the lower end of the shaft section 82. The lower extremity of shaft section 82 has a hole 96 in it, the latter forming a bearing for the spindle 97 that rises from the upper surface of the bottom of the vessel. It is attached in place by means of spot welding or by resorting to other usual expedients. A strengthening collar 98 connects the bottoms of the inner and outer housings 14 and 16 directly below spindle 97. As an alternative the blades 90 and 91 may be separately pivoted on hub 88 or onto the shaft or a part carried by the shaft.

There are means for retaining the agitator hub 88 centered on the shaft 82 as the agitator is caused to rotate. These means are of immensely simple construction, consisting of a washer 99 which is fitted over the lowermost section 82 of the shaft 26 and which rests upon the top surface of pin 95. Washer 99 is of such diameter that there is a small clearance between its periphery and the inner surface of the hub 88. Since it is very close to the tilt axis of the agitator 88, it permits the hub of the agitator to tilt all that is necessary so that the agitator will follow the sloping surface of the bottom of the vessel, but will not slip. Any tendency to slip excessively is prohibited by the periphery of the washer 99 coming to bear against the inner surface of the hub 88 of agitator 86.

Runners are operatively connected with the agitator 86. These runners are preferably small nylon feet such as at 102 and 104, each being carried by its small mounting bracket 106 and 108 respectively that protrudes laterally from the lower surface of the blades 90 and 91 of agitator 86. Runners in the form of spiral or circular ridges may be formed on the bottom of the vessel, although this provides the obvious drawback of forming a shoulder against which some of the products that are to be mixed may accumulate. A further alternative is in the material of the runners. Although nylon is suggested, there are many other synthetic resinous materials, for example "Teflon," that will function equally as well. Other materials such as metals may be resorted to in this connection. The same holds true with respect to the other parts of the vessel and agitator for it. The materials may be selected with engineering skill in order to form a durable and satisfactorily operative product.

In use, the ingredients to be mixed are placed into the vessel. Valve 32 is in the closed position and the motor 38 is energized. This causes rotation of shaft 26 which is imparted to rotary movement of the agitator 86. The agitator is driven by the drive and pivotal means 84 so that not only is there a pure rotation imparted to the agitator but there is also a tilting motion component involved inasmuch as the bottom of the vessel is in a sloped condition with respect to the axis of rotation of shaft 26 (Figure 1). During the rotation of agitator 86, it assumes a cam action movement with the bottom of the vessel functioning as a stationary cam, whereby the agitator follows closely the bottom surface of the vessel so as to have a much more effective mixing action than is found with other agitators which are presently available.

The foregoing is considered as illustrative only of the principles of the invention. Further, numerous modifications and changes will readily occur to those skilled in the art. It is not desired to limit the invention to the exact construction and operation shown and described, and accordingly, all suitable modifications and equivalents may be resorted to which fall within the scope of the invention as claimed.

What is claimed as new is as follows:

1. For use in a vessel that has a bottom, a motor driven shaft, an agitator having a hub and a pair of blades, a slot in said hub, a pin fixed to said shaft and extending into said hub to establish a drive connection between said shaft and the agitator to tilt as it is rotated so as to follow the surface of said bottom.

2. For use in a vessel that has a bottom, a motor driven shaft, an agitator having a hub and a pair of blades, a slot in said hub, a pin fixed to said shaft and extending into said hub to establish a drive connection between said shaft and the agitator to tilt as it is rotated so as to follow the surface of said bottom, and a runner on each blade and which is slidable on the surface of said bottom as the agitator is actuated whereby said bottom functions as a cam in pivotally actuating blades of the agitator.

3. A mixing device that has a vessel provided with an outlet, a side wall and a bottom that is arranged to direct the vessel contents toward said outlet, together with a motor operated shaft parallel to said side wall, the improvement comprising an agitator having a hub, blades protruding radially from said hub, means carried by said blades and contacting the upper surface of said bottom for supporting said blades in a position with the lower surface of said blades spaced slightly from the upper surface of said bottom, means pivotally and drivingly connecting said shaft with said hub, and means for preventing said hub from shifting laterally with respect to said axis of rotation including a member having a periphery closely adjacent to the inner surface of said hub and mounted on said shaft, said member being confined within the side wall of said hub.

4. The device of claim 3 wherein said shaft is spaced from said bottom of the vessel, a spindle rising from said bottom, said shaft having an opening at its lower end in which said spindle is disposed in order to hold said shaft centered during its rotation.

5. The device of claim 4 wherein said means holding said agitator spaced slightly from said bottom comprise runners that are attached to each blade of the agitator.

6. For use in a materials mixing device that has a vessel, a shaft in said vessel, and an outlet at the lower part of the vessel, the improvement comprising a bottom in said vessel which slopes toward said outlet for drainage of the mixed materials and ingredients from the vessel, an agitator, means mounting said agitator for rocking movement about an axis transverse to the axis of rotation of said shaft, said means including a drive pin and a longitudinal slot in said shaft and said agitator.

7. In a mixing device for dairy products which include both liquid and dry material, the combination of a vessel which has sidewalls, a top having an opening, and a bottom which slopes, a rotary shaft mounted for rotation in said vessel, means extending through said opening for actuating said shaft, an agitator having at least one blade to admix the material in said vessel, means including a slot and pin connection structure in said agitator and shaft drivingly connecting said agitator to said shaft for rotation of said agitator by said shaft and for tilting movement about an axis substantially transverse to the axis of rotation of said shaft thereby enabling said agitator blade which constitutes a part of the agitator to follow the angularity of said vessel bottom and prevent the accumulation of unmixed material beneath said agitator, and means operatively connected with said blade of said agitator and with said sloped bottom of said vessel for guiding said blade over said sloped bottom and maintaining said blade in a substantially uniform spatial relationship to said bottom during the rotation of said agitator.

References Cited in the file of this patent

UNITED STATES PATENTS

| | | |
|---|---|---|
| 1,827,004 | Gibson | Oct. 13, 1931 |
| 2,321,453 | Boileau | June 8, 1943 |
| 2,513,254 | Savage et al. | June 27, 1950 |
| 2,686,045 | Byberg | Aug. 10, 1954 |